United States Patent [19]

Fujita

[11] 4,041,308

[45] Aug. 9, 1977

[54] AUTOMATIC CONTROL DEVICE FOR CORRECTING FILTERS

[75] Inventor: Yoshihiro Fujita, Tokyo, Japan

[73] Assignee: Fuji Photo Film Co., Ltd., Minami-ashigara, Japan

[21] Appl. No.: 685,219

[22] Filed: May 11, 1976

[30] Foreign Application Priority Data

May 13, 1975 Japan .................................. 50-56972

[51] Int. Cl.² .............................................. G01J 3/34
[52] U.S. Cl. ................................ 250/226; 250/214 P; 354/31
[58] Field of Search ................... 250/201, 214 P, 209, 250/226; 354/31

[56] References Cited

U.S. PATENT DOCUMENTS

| 3,809,892 | 5/1974 | Schober | 250/226 |
| 3,904,872 | 9/1975 | Ebukuro et al. | 250/226 |
| 3,924,121 | 12/1975 | Barbieri | 250/214 P |

*Primary Examiner*—David C. Nelms
*Attorney, Agent, or Firm*—Sughrue, Rothwell, Mion, Zinn and Macpeak

[57] ABSTRACT

A control device, adapted to automatically insert a proper correcting filter in a photographing light path dependent upon the color balance of the film used and the type of lighting conditions, is disclosed. Three signals are developed indicating, respectively, that the illuminating light is sunlight, incandescent light, and fluorescent light. The different types of light are detected by a pair of discriminators, one of which is based upon spectral content and the other of which is based on the presence of flicker. Incandescent light is distinguished from the other types of light by its unique spectral characteristic. Sunlight is distinguished from the other types by the absence of an a.c. flicker in such light. The three signals are applied to a mechanism which inserts the filters. A switching means is provided in-between the latter three signals and the filters so that the set of filters connected to be responsive to the three signals depends upon the color balance of the film used.

7 Claims, 10 Drawing Figures

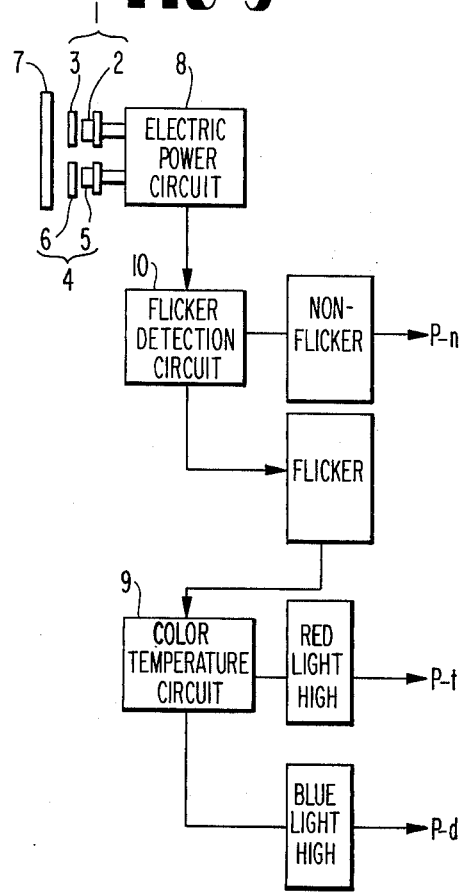
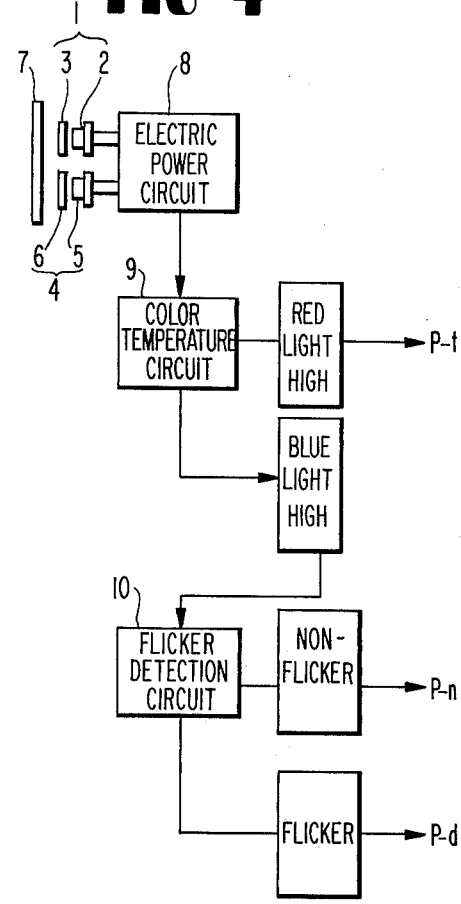
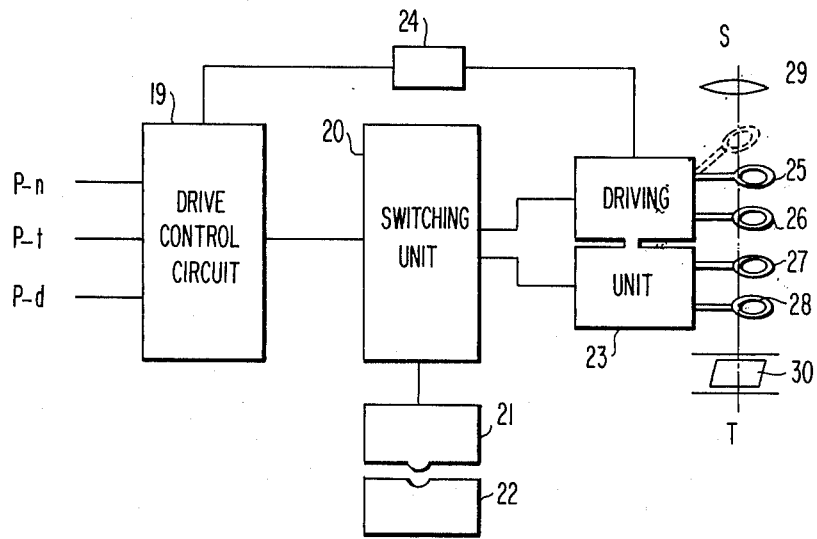

AUTOMATIC CONTROL DEVICE FOR CORRECTING FILTERS

BACKGROUND OF THE INVENTION

This invention relates to an automatic control device for filters to correct the spectral characteristics of illuminating lights in response to the color temperature thereof and the presence of flickers.

It is conventional practice to place a correcting filter on a camera lens when the lighting conditions are different from the lighting conditions for which the load film is designed. Several automatic means for selecting the proper correcting filter are known in the art. Examples are disclosed in Japanese Pat. Publication No. 26700/1968, No. 27576/1968 and No. 14431/1971. Such devices are designed to select the correcting filter in response only to the color temperatures of the illuminating light. However, since the light from a fluorescent lamp has a color temperature comparatively similar to that of ordinary sunlight, it is extremely difficult to discriminate sunlight from fluorescent lamp light only by differentiating their respective color temperatures. Consequently most photographic images obtained under fluorescent lighting conditions tend to be green even if a colored negative film or reversal film is used.

SUMMARY OF THE INVENTION

It is therefore an object of the present invention to provide means for distinguishing between the three common photography lighting conditions, viz., incandescent lighting, fluorescent lighting, and ordinary sunlight.

It is a further object of the present invention to provide a means for use in a camera for inserting a proper correcting filter in the photographic light path depending upon the color balance of the film used and the type of illuminating light. In accordance with the present invention there is provided a light quality disciminating means which can discriminate between different color temperatures and can detect the presence of flickers, so that a correcting filter required for any of the above three lighting conditions can be automatically selected in response thereto.

BRIEF DESCRIPTION OF THE DRAWINGS

FIGS. 4 and 5 are block diagrams of light quality discriminating devices employed in the present invention;

FIG. 6 is a block diagram of correcting filter driving and control devices employed in the present invention;

DETAILED DESCRIPTION OF THE INVENTION

Figure 1:
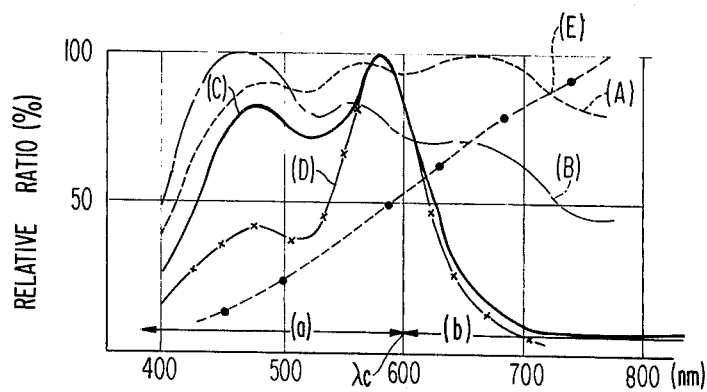
FIG. 1 shows the spectral characteristics of various kinds of illuminating lights.

In FIG. 1, curves (A) to (E) indicate the spectral characteristics of various kinds of illuminating lights. Both the direct sunlight (A) and average daylight (B) having average spectral characteristics in the visible light zone (400 to 800 nm). Daytime light (C) emitted by a fluorescent lamp has a spectral characteristic which is similar to those of curves (A) and (B) in the zone below the intermediate wavelength $\lambda_c$ of 600 nm, and which drops sharply in the zone of wave length $\lambda_c$. Further, white color light (D) emitted by a fluorescent lamp has a large peak in the zone of wavelengths shorter than the intermediate wavelength $\lambda_c$. In contrast to the above-mentioned spectral characteristics, the light emitted by an incandescent lamp has a spectral characteristic, indicated by curve (E), which rises linearly from the ultravoilet ray zone to the infrared ray zone.

Accordingly if the visible light zone is divided into two zones, with $\lambda_c = 600$nm being the dividing point, and the intensity of the light in the two zones are compared, the light from an incandescent lamp can be easily distinguished from other types of light. The two light zones are referred to herein as the visible ultraviolet zone ($a$) and the visible infrared zone ($b$).

Although not shown specifically in the drawings, it is will known that fluorescent lighting and incandescent lighting which is energized by an a.c. power source will produce flickers corresponding to the alternating current frequency. Therefore, incandescent and fluorescent lighting can be differentiated from sunlight depending on whether the flickers exist or not.

FIG. 4 shows one example of a light quality discriminating device adapted to effect the combination of the above-mentioned methods of discrimination, that is; to discriminate at first between incandescent light and all others depending on the color temperature, and if the result indicates a different type of light source, to detect whether it is sunlight or not depending on the presence of flickers. Reference numeral 1 denotes a first light receiver means comprising a filter 3 and a light receiver element 2, and 4 denotes a second light receiver means comprising a filter 6 and a light receiver element 5. The first and second light receiver means 1 and 4 serve to receive the light which has passed through a diffuser 7.

Figure 2:
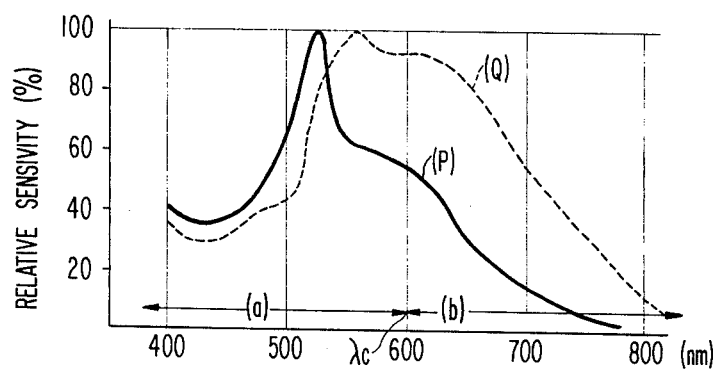
FIG. 2 shows the spectral sensitivity characteristics of light receiver elements.
Figure 3:
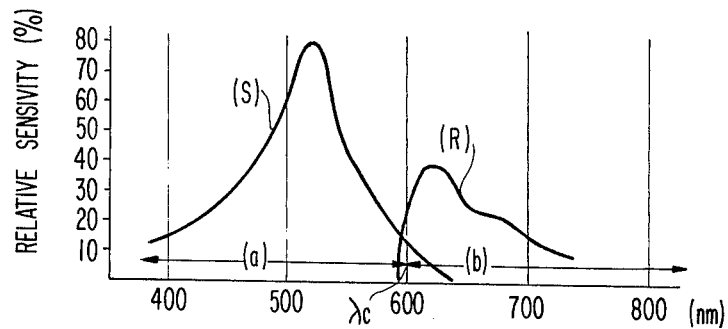
FIG. 3 shows the spectral sensitivity characteristics of the combination of filters and light receiver elements.

The light receiver element 2 of the first light receiver means 1 and the light receiver element 5 of the second light receiver means 4 are made of cadmium sulfide (CdS), the resistance of which varies according to the amount of light received thereby and which has a spectral sensitivity characteristic in the visible light zone as indicated by curve (P) in FIG. 2. The filter 3 of the first light receiver means 1 has a permeability in the infrared visible light zone ($b$). In FIG. 3, as indicated by curve (R), the first light receiver means 1 as a whole is adapted to have a sensitivity characteristic in the infrared visible light zone ($b$). The filter 6 of the second light receiver means 4 is adapted to cut off the light in the infrared visible light zone ($b$) and has filtering characteristics to pass the light in the ultraviolet visible light zone ($a$). The second light receiver means 4 has a sensitivity characteristic in the ultraviolet visible light zone ($a$) as indicated by curve (S) in FIG. 3. As can be seen from FIG. 3, the sensitivity characteristic (R) is different from the sensitivity characteristic (S), but as mentioned hereinafter for the purpose of comparison of the amount of light received by them, it is essential to balance the two.

As will be apparent several different types of light receiver elements 2 and 5, having various light receiving characteristics, such as indicated by curves P and Q in FIG. 2, may be employed. It is preferable, however, to use light receiver elements having an excellent response, such as phototransistors, silicon photocells and photoelectric tubes etc., which can be advantageously used for the detection of flickers. In the light receiver means in the above-mentioned light quality descriminating device, the sets of filters and light receiver means each having different spectral characteristics are used in combination. However, it is needless to say that light receiver elements having different spectral sensitivity characteristics may be used independently.

Reference numeral 8 denotes an amplifier for amplifying the voltage outputs of the light receiver elements 2 and 5 and for providing the amplified voltages to a color temperature discriminating circuit 9. The color temperature circuit 9 compares the output voltage of the light receiver element 2 with that of the light receiver element 5 to determine which is larger.

Although it is desirable to amplify the voltages to ensure the same output voltage for the same amount of light received, the discrimination or the relative comparison of voltage levels can be achieved by incorporating the light receiver elements, for example, in a bridge circuit so that the relative voltage ratio can be obtained.

The above-mentioned color temperature circuit 9 serves, as mentioned hereinabove, to discriminate or compare the level of output voltage of the first light receiver means 1 with that of the second light receiver means 4 to determine whether or not the illuminating light is incandescent lighting. The circuit 9 produces a signal *p-t* when the amount of light received by the first light receiver means 1 is more than that received by the second light receiver means 4 thereby indicating an incandescent light source. When the amount of light received by the second light receiver means 4 is equal to or greater than that received by the first light receiver element 1, the output of the second light receiver means 4 is applied to a flicker detector circuit 10, which is the second discriminating circuit.

The flicker detector circuit 10 serves to amplify the output of the second light receiver means 4 so as to detect the presence of flickers which are not included in the sunlight. The circuit 10 produces a sunlight signal *p-n* when flickers do not exist, and produces a fluorescent lamp light signal *p-d* when flickers exist. FIG. 5 illustrates a light quality discriminating device adapted to detect first whether the illuminating light is sunlight or not depending on the presence of flickers, and then to detect whether the illuminating light is from an incandescent light source or a fluorescent light depending on the color temperature. The presence of flickers can be determined from one or both of the output voltages of the light receiver elements 2 and 5. In this embodiment, a discriminating system can be employed which is similar to that of the embodiment shown in FIG. 4. Since only the sunlight does not include flickers, a sunlight signal *p-n* is sent out when no flickering is detected. In the case flickers are detected, the output voltage level of the first light receiver 1 is compared with that of the second light receiver means 4 by means of the color temperature circuit 9 to determine whether the amount of light received in the infrared visible light zone (*b*) or that received in the ultraviolet visible light zone (*a*) is the larger. When the amount of light received by the first light receiver means 1 is greater than that received by the second light receiver means 4, the color temperature circuit 9 produces an incondescent source light signal *p-t*, and in the contrary case, it produces a fluorescent lamp light signal *p-d*.

Figure 8:
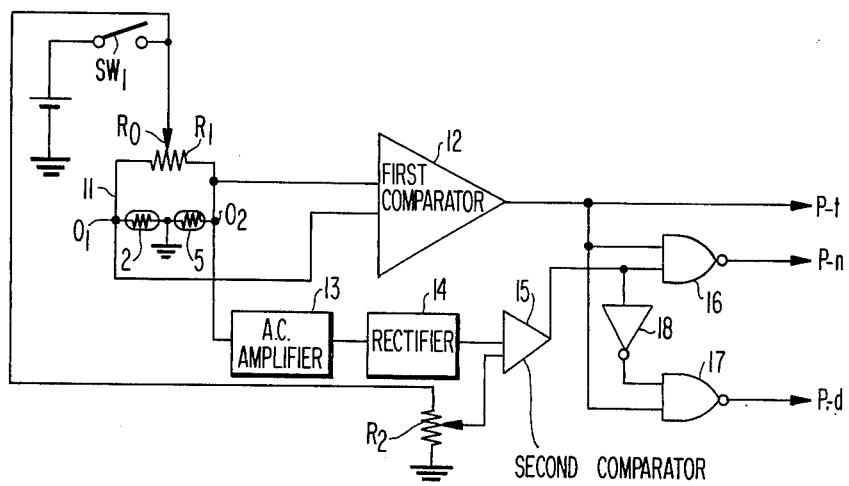
FIG. 8 is a circuit diagram for explaining in detail the block diagram shown in FIG. 4.

A specific example of the light quality discriminating circuit is shown in FIG. 8. Reference character $SW_1$ denotes a switch which is interlocked, for example, with a shutter release mechanism of a camera so as to be turned on when the shutter is depressed. Reference numeral 11 represents a bridge circuit for detecting the amount of light received. The bridge circuit comprises the light elements 2 and 5, as described above, and a variable resistance $R_1$, which serves to set a balanced condition between the first and second light receiver elements 2 and 5 by adjusting a movable contact Ra. Output terminal $O_1$ on the side of the first light receiver element 2 and output terminal $O_2$ on the side of the second light receiver element 5 of the above-mentioned bridge circuit 11 are connected to a first comparator 12. The first comparator 12 serves to compare the output voltage $V_1$ at terminal $O_1$ with the output voltage $V_2$ at terminal $O_2$ and produce a "low" output when $V_1$ is lower than $V_2$, a "high" output when $V_1$ is equal to or higher than $V_2$. The output terminal $O_2$ of the second light receiver element 5 is further connected as the input of amplifier 13 which amplifies the a.c. component of the voltage appearing at the terminal $O_2$. The amplified output, representing the flicker component of the light source, is rectified by rectifier 14 and compared in a second comparator 15 with a reference voltage set by adjusting variable resistor $R_2$. The comparator 15 output is high if the reference voltage is larger than the rectifier voltage, and low if the reference voltage is equal to or below the rectified voltage. Thus a low output indicates a large amount of flicker and a high output indicates a small amount of flicker. By applying the outputs of the comparators 12 and 15 to the logic circuit comprising NAND gates 16 and 17 and INVERT gate 18, the signals *p-t*, *p-n*, and *p-d* are produced.

Thus when the source is an incandescent lamp, $V_2 > V_1$, the comparator 12 output is low and therefore *p-t* is low, indicating an incandescent source. Since one of the inputs to each of NAND gates 16 and 17 is low, the *p-n* and *p-d* outputs are high irrespective of the condition of comparator 15.

When the source of light is sunlight, $V_2 \leq V_1$, the comparator 12 output will be high, and the comparator 15 output will be low. Output *p-t* is high; both inputs to NAND 16 are high, therefore *p-n* is low; the inputs to NAND 17 are high and low, respectively, therefore *p-d* is high. The low output at *p-n* indicates sunlight as the source.

When the source of light is a fluorescent lamp, $V_2 \leq V_1$, the comparator 12 output is high, and the comparator 15 output is low. Therefore, *p-t* is high; the inputs to NAND 16 are high and low, respectively, therefore *p-n* is high; both inputs to NAND 17 are high, therefore *p-d* is low. A low output at *p-d* indicates a fluorescent source.

One embodiment of a device adapted to insert a correcting filter into a photographing optical path of a camera in response to the signal produced by the above-mentioned circuit is shown in FIG. 6. The device is adapted to insert a correcting filter lens 25-28 in the optical path S-T between a camera lens 29 and film 30. The particular correcting filter selected depends upon a color balance of the film used and upon the type of illuminating light.

Reference numeral 19 denotes a drive indicating circuit which receives as inputs thereto the signals *p-n*, *p-t* and *p-d* produced by the light quality discriminating device as shown in FIGS. 4 and 5. The drive control circuit 19 is arranged to send out a control signal to:

actuate a correcting filter 25 by inserting the filter into the optical path ST when only the sunlight signal p-n is low and both the signals p-t and p-d are high; actuate a correcting filter 27 when only the incandescent lamp light signal p-t is low and both the signals p-n and p-d are high; and actuate correcting filters 26 and 28 when only the fluorescent lamp light signal p-d is low and both the signals p-n and p-t are high. The device serves to continuously maintain a correcting filter in the path ST while it receives a signal from the light quality discriminating device. However, as pointed out above the selection of the correcting filter is also dependent upon the color balance of the film used.

Figure 7:
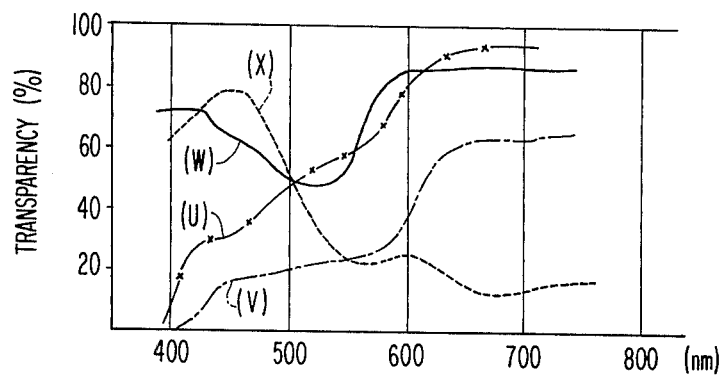
FIG. 7 shows the spectral permeability of the correcting filter.

For example the correcting filter 25 for the sunlight and the correcting filter 26 for fluorescent lighting are provided for use with films of the tungsten type, and no correcting filter is needed when such film is used with the illuminating source being an incandescent lamp. Further, the correcting filter 27 for incandescent lighting and the correcting filter 28 for fluorescent lighting are provided for use with the films of the daylight type, and no correcting filter is needed when such film is used with the illuminating source being sunlight. The correcting filters 25 to 28 should preferably have a spectral permeability as shown in FIG. 7. In FIG. 7, curve (U) represents the permeability for the filter 25, (V) for the filter 26, (W) for the filter 27, and (X) for the filter 28.

Reference numeral 20 denotes a switching unit adapted to effect change-over of the set of correcting filters and is interlocked with a film type detector unit 21. The switching unit 20 serves to effect a change-over operation to actuate only the set of the correcting filters 25 and 26 when it detects that the film is a tungsten type, and actuate only the set of the correcting filters 27 and 28 when it detects that the film is a daylight type. Reference numeral 21 denotes a film type detector unit adapted to be mounted in a camera, and 22 a film type indicator unit adapted to be mounted in a film magazine in accordance with the type of color balance of the film to be used. When a magazine is loaded in a camera, the film type detector unit 21 is operated interlocking with the film magazine indicator unit 22 so as to actuate the switching unit 20. Thereby, only the set of correcting filters to be actuated is rendered operative. Further, the switching unit 20 may be manually actuated without using the film type detector unit 21 and the film type indicator unit 22. Reference numeral 23 denotes a correcting filter driving unit adapted to receive the power from a power supply 24 so as to actuate the correcting filter in response to the signal transmitted by the drive indicating circuit 19 and sent through the switching unit 20. Further, when the correcting filter driving unit is actuated, the correcting filter is moved into a photographing optical path S-T of the camera, and when the unit is not activated, the correcting filter will be retracted outside the optical path S-T.

Figure 9:
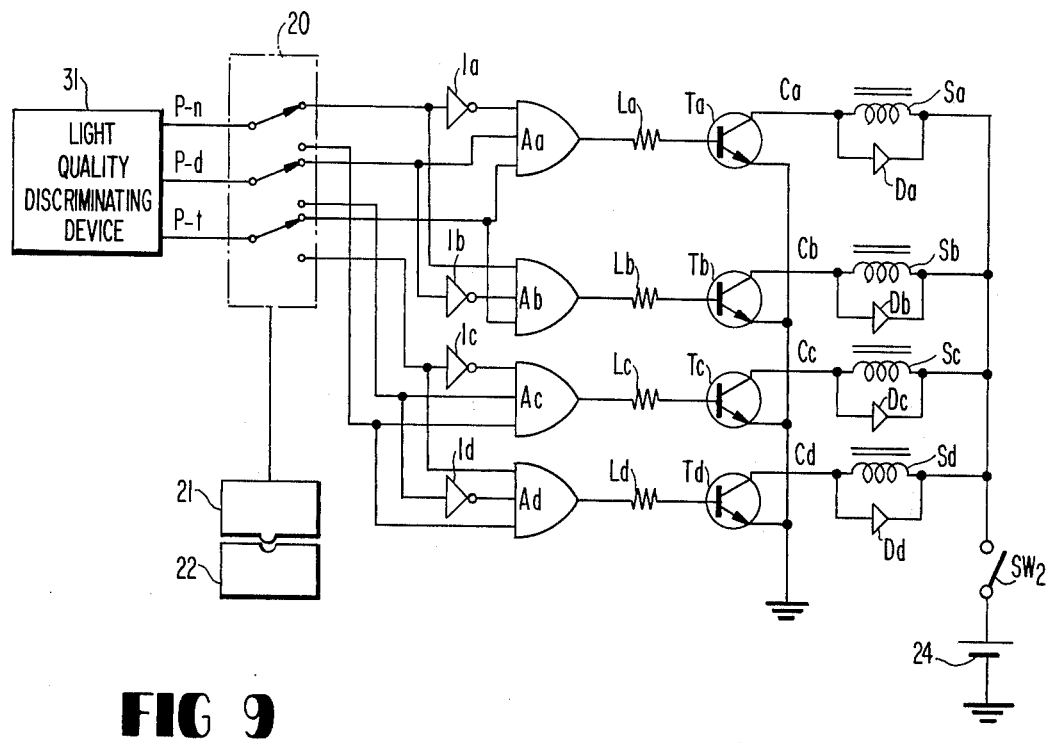
FIG. 9 is a circuit diagram of another embodiment of the correcting filter driving and control devices.
Figure 10:
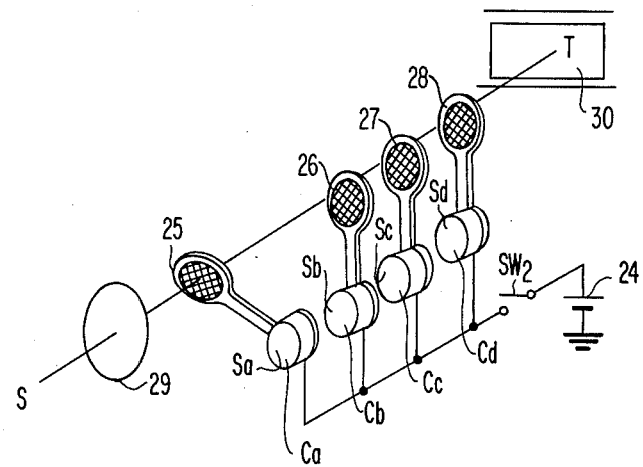
FIG. 10 is a perspective view of the correcting filter driving devices.

A more concrete example of an arrangement for inserting a correcting filter into the optical path of a camera by utilizing a light quality discriminating signal transmitted by the light quality discriminating device will be described with reference to FIGS. 9 and 10. FIG. 9 illustrates a drive control unit adapted to receive as inputs thereof signals p-n, p-t and p-d sent out by a light quality discriminating device 31 as shown in FIG. 8 and insert a correcting filter, corresponding to the illuminating light, into the photographing optical path of a camera. FIG. 10 shows an example of the driving unit.

Reference characters Sa, Sb, Sc and Sd denote rotary solenoids adapted to rotate the correcting filters 25, 26, 27, and 28, respectively, when they are energized. FIG. 10 illustrates a condition wherein the rotary solenoid Sa is energized to rotate the movable portion thereof to insert correcting filter 25 into the optical path S-T. The rotary solenoids are fixedly secured to a camera body (not shown) and are arranged to insert a proper correcting filter into the optical path S-T of the camera when actuated, and to retract the correcting filter outside the optical path S-T of the camera when not actuated. Further, in FIG. 10, the correcting filters are shown as being located between a lens 29 of the camera and a film 30.

Referring to FIG. 9, the rotary solenoids are connected with the positive side of a power supply 24 and collectors Ca, Cb, Cc and Cd of power transistors Ta-Td of a drive indicating circuit respectively. The drive control circuit includes four AND gates Aa, Ab, Ac and Ad and four invertors Ia, Ib, Ic and Id. The outputs of the four AND gates are sent to the four power transistors Ta, Tb, Tc and Td so as to actuate the rotary solenoids. Reference characters La, Lb, Lc and Ld represent input side resistors for protecting the power transistors Ta, Tb, Tc and Td, respectively. Reference characters Da, Db, Dc and Dd denote diodes for absorbing the reverse voltage caused by the rotary solenoids Sa, Sb, Sc and Sd when the power transistors Ta, Tb, Tc and Td are turned off.

As described previously, the switching unit 20 is operated interlocking with the film type detector unit 21 and the film type indicator unit 22 or is manually operable to select or change the set of correcting filters to be used. When a film of the tungsten type is used, the three moveable switching contacts of the switching unit 20 occupy their upper positions as shown in FIG. 9. However, when a film of daylight type is used, the three switching contacts will occupy their lower positions.

The operation of a camera comprising a drive indicating circuit and a drive unit as shown in FIGS. 9 and 10 will be described hereinbelow in detail.

Table 1 shows the relationship between inputs and outputs of the drive controls for the various conditions of, types of color balance of films and illuminating light source. In the Table, the references character L denotes low, and H high. The oblique lines in the table indicate that the low conditions of the AND gates designated is the result of open circuit input terminals.

Table 1

| Type of Color Balance of Film | Tungsten Type | | | daylight type | | |
|---|---|---|---|---|---|---|
| Photographing light source | sunlight | incandescent lamp light | fluorescent lamp light | sunlight | incandescent lamp light | fluorescent lamp light |
| p-n output | L | H | H | L | H | H |
| p-t output | H | L | H | H | L | H |
| p-d output | H | H | L | H | H | L |
| Output of AND gate Aa | H | L | L | L | L | L |
| Output of AND gate Ab | L | L | H | L | L | L |
| Output of AND gate Ac | L | L | L | L | H | L |

Table 1-continued

| Type of Color Balance of Film | Tungsten Type | | | daylight type | | |
|---|---|---|---|---|---|---|
| Photographing light source | sunlight | incandescent lamp light | fluorescent lamp light | sunlight | incandescent lamp light | fluorescent lamp light |
| Output of AND gate Ad | L | L | L | L | L | H |

Let us assume that a film of tungsten type is loaded into a camera, so that manual or automatic changeover of switch 20 results in the contacts being exactly as shown in FIG. 9, and a photograph is to be taken in sunlight. These conditions correspond to the first column in Table 1. Upon depressing the shutter, a power supply switch $SW_1$ (FIG. 8) is turned on to actuate the light quality descriminating device so that the sunlight signal p-n will become low and the other signals p-t and p-d will become high. The output is sent as an input to the drive control circuit shown in FIG. 9 so that only the AND gate Aa will produce a high output as can be seen from Table 1. Subsequently, the high output is applied as a base voltage to turn on the power transistor Ta so that its collector and emitter forms a conductive path therebetween, and only the solenoid Sa is energized to move the correcting filter 25 into the optical path of the camera as illustrated in FIG. 10. The circuit operation under other film and lighting conditions should be clearly understood from the description of the latter example and from Table 1.

If the illuminating light is continuously received without any change, the signal p-n remains low so that the rotary solenoid Sa can continue to maintain the correcting filter 25 in the optical path. For this reason, if the power supply switch $SW_2$ (FIG. 9) is interlocked with the shutter release of a movie camera, the arrangement can be made such that a correcting filter corresponding to the illuminating light can be maintained in the optical path when taking a photograph, and if the illuminating light changes the correcting filter will be changed over to the proper one.

As is obvious from the foregoing description, if the light quality discriminating device, the correcting filters, the drive unit and the drive control unit according to the present invention are all mounted in a camera, a proper correcting filter can be automatically set when taking a photograph, even if the quality of the illuminating light source changes.

Therefore, it is not necessary for the camera user to discriminate or check the quality of the illuminating light and have the knowledge and experience of correcting filters. Accordingly, even if the type of color balance of the film to be used changes, and irrespective of whether the illuminating light is sunlight, incandescent lighting or fluorescent lighting, an excellent photograph can always be taken.

What is claimed is:
1. An automatic filter selection apparatus, for selecting from a plurality of light condition correcting filters the proper ones for use in a photography operation, comprising
   a. a first discriminator means responsive to the spectral characteristic of an illuminating source of light for providing a first output signal, the condition of which indicates whether or not the illuminating source of light is incandescent lighting,
   b. a second discriminator means responsive to the amount of flicker is an illuminating source of light for providing a second output signal, the condition of which indicates whether or not the illuminating signal is sunlight,
   c. first logic means responsive to said first and second output signals for generating a group of logic output signals, the condition of which indicates whether the illuminating light is sunlight, incandescent or fluorescent,
   d. first selecting means responsive to said group of logic signals for selecting a correcting filter from a first set of said correcting filters in dependence upon the condition of said logic signals,
   e. second selecting means responsive to said group of logic signals for selecting a correcting filter from a second set of said correcting filters in dependence upon the condition of said logic signals, and
   f. switching means for selectively applying said group of logic signals to said first and second selecting means.

2. An automatic filter selection apparatus as claimed in claim 1 wherein said first discriminator comprises, first and second electro-optical light sensing means, responsive to visible light having wave lengths above a preselected midrange wave length value and below said midrange wave length value, respectively, for developing voltages dependent thereon, and a first comparator means responsive to said developed voltages for providing an output signal of a first value, if the amount of light detected by the first sensing means is greater than the amount of light detected by said second sensing means, and of a second value if the amount of light detected by said first sensing means is equal to or less than that detected by said second sensing means.

3. An automatic filter selection apparatus as claimed in claim 2 wherein said second discriminator comprises, a.c. circuit means responsive to at least one of said voltages developed by said sensing means for isolating the a.c. component of said voltage, rectifying means for rectifying said isolated a.c. component, and a second comparator means for comparing said rectified a.c. component with a preset reference voltage and providing an output signal of a first value when said rectified component is greater than said reference voltage, and of a second value when said rectified component is less than said reference voltage.

4. An automatic filter selection apparatus as claimed in claim 3 wherein each said first and second selecting means comprises, a plurality of solenoids for controlling the movement into said optical path of a plurality of correcting filters, respectively, which constitute the filters of the corresponding set of filters, a plurality of driving circuits for said plurality of solenoids, each of said driving circuits energizing a respective one of said solenoids to move a respective one of said filters in said optical path in response to a logic signal applied thereto, and a plurality of logic circuits for providing logic signals to said plurality of driving circuits, each of said logic circuits of said first selecting means having said group of logic outputs connected as inputs thereto when said switching means is in a first switching position, and each of said logic circuits of said second selecting means having said group of logic outputs connected as inputs thereto when said switching means is in a second switching position.

5. An automatic filter selection apparatus as claimed in claim 3 wherein said first set of filters comprises a sunlight filter and a first fluorescent light filter, adapted for use with a film of the tungsten lamp type under conditions of sunlight and fluorescent light, respectively, and wherein said second set of filters comprise an incandescent light filter and a second fluorescent light filter, adapted for use with a film of the daylight type under conditions of incandescent light and fluorescent light, respectively.

6. An automatic filter selection apparatus as claimed in claim 5 wherein said switching means connects said first selecting means to said group of logic outputs when the film to be used is a film of the tungsten lamp type, and connects said second selecting means to said group of logic outputs when the film to be used is of the daylight type.

7. An apparatus as claimed in claim 2 wherein said first electro-optical light sensing means comprises a first optical filter having an optical permeability which extends substantially over the entire visable region above said midrange wave length, and a first photo-detector positioned to receive light passing through said first optical filter, and wherein said second electro-optical light sensing means comprises a second optical filter having an optical permeability which extends substantially over the entire visible region below said midrange wavelength, and a second photo-detector positioned to detect light passing through said second optical filter.

* * * * *